(12) United States Patent
Tokkonen (10) Patent No.: US 8,412,170 B2
(45) Date of Patent: Apr. 2, 2013

(54) APPARATUS FOR A RECEIVING PARTY

(75) Inventor: Timo Tokkonen, Oulu (FI)

(73) Assignee: Nokia Corporation, Espoo (FI)

( * ) Notice: Subject to any disclaimer, the term of this patent is extended or adjusted under 35 U.S.C. 154(b) by 97 days.

(21) Appl. No.: 12/880,013

(22) Filed: Sep. 10, 2010

(65) Prior Publication Data

US 2012/0064871 A1    Mar. 15, 2012

(51) Int. Cl.
*H04M 3/42* (2006.01)

(52) U.S. Cl. .......... 455/415; 455/456.1; 455/412.2; 705/14.39; 379/211.02

(58) Field of Classification Search .......... 455/415, 455/445, 456.1, 412.2; 370/384, 385; 379/67.1, 379/211.02, 92.03, 230, 154, 373.02, 142.01, 379/246, 902, 355.08; 707/999.01; 709/200; 725/13, 105, 127; 348/14.01; 705/14.39
See application file for complete search history.

(56) References Cited

U.S. PATENT DOCUMENTS

| | | | |
|---|---|---|---|
| 5,872,841 A * | 2/1999 | King et al. | 379/210.01 |
| 7,142,841 B1 * | 11/2006 | Almassy | 455/412.1 |
| 2004/0224701 A1 * | 11/2004 | Lewis-Evans et al. | 455/456.2 |
| 2006/0009264 A1 * | 1/2006 | Seo et al. | 455/563 |
| 2006/0018295 A1 * | 1/2006 | Choi et al. | 370/338 |
| 2006/0047825 A1 * | 3/2006 | Steenstra et al. | 709/229 |
| 2006/0095790 A1 * | 5/2006 | Nguyen et al. | 713/186 |
| 2006/0246881 A1 | 11/2006 | Winkler et al. | 455/415 |
| 2007/0082668 A1 * | 4/2007 | Silver et al. | 455/432.3 |
| 2007/0088839 A1 * | 4/2007 | Yoakum | 709/228 |
| 2007/0121590 A1 * | 5/2007 | Turner et al. | 370/352 |
| 2008/0132243 A1 * | 6/2008 | Spalink et al. | 455/456.1 |
| 2008/0246881 A1 | 10/2008 | Kim | |
| 2009/0088168 A1 * | 4/2009 | Varanasi | 455/445 |
| 2009/0209271 A1 * | 8/2009 | Reed et al. | 455/456.6 |
| 2010/0087173 A1 * | 4/2010 | Lin et al. | 455/412.2 |
| 2010/0159946 A1 * | 6/2010 | Cheung et al. | 455/456.1 |
| 2010/0296634 A1 * | 11/2010 | Schulzrinne et al. | 379/45 |

FOREIGN PATENT DOCUMENTS

| | | |
|---|---|---|
| EP | 1 193 955 A2 | 4/2002 |
| EP | 1452988 A1 | 1/2004 |
| GB | 2463112 A | 3/2010 |
| GB | 2478765 A | 9/2011 |
| WO | WO-2009/056784 A1 | 5/2009 |

* cited by examiner

*Primary Examiner* — Mahendra Patel
(74) *Attorney, Agent, or Firm* — Harrington & Smith

(57) ABSTRACT

Apparatus comprising at least one processor configured to compare an identifier of a calling party with one or more contacts of a receiving party to determine privilege information associated with the calling party, the privilege information providing one or more authorised receiving party location-based responses. The apparatus further comprising at least one processor configured to determine a location of the receiving party and provide an associated authorised response to the calling party.

19 Claims, 4 Drawing Sheets

Figure 6

APPARATUS FOR A RECEIVING PARTY

TECHNICAL FIELD

The present disclosure relates to the field of an apparatus for a receiving party, associated methods, computer programs and apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs), and can include a touch sensitive screen.

The portable electronic devices/apparatus according to one or more disclosed aspects/embodiments may provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

SUMMARY

In a first aspect, there is provided apparatus comprising:
at least one processor; and
at least one memory including computer program code;
the at least one memory and the computer program code configured to, with the at least one processor, cause the apparatus at least to
  compare an identifier of a calling party with one or more contacts of a receiving party to determine privilege information associated with the calling party, the privilege information providing one or more authorised receiving party location-based responses; and
  determine a location of the receiving party and provide an associated authorised response to the calling party.

The one or more authorised receiving party location-based responses can be considered as responses for potential locations of the receiving party, and are authorised as acceptable for the associated calling party in accordance with the privilege information.

The privilege information can enable the apparatus to respond to the calling party in a way that is appropriate for a relationship between the calling party and a user of the apparatus. For example, the wife/husband/partner of the receiving party can be provided with a response that includes detailed personal information of the user of the apparatus, whereas a business acquaintance (for example a business partner or secretary) can be provided with a response that relates to work matters only. In some embodiments, if the calling party cannot be identified as a contact associated with the apparatus, then a response may be provided in accordance with the lowest possible privilege level, for example the response may be limited to a "busy" tone.

The response is also provided in accordance with the location of the receiving party, and this can further enable the response to be tailored for a specific location of the receiving party. One or more of the "authorised receiving party location-based responses" that are identified as suitable for the privilege information of the calling party can be selected as the "associated authorised response" in accordance with location of the receiving party. This can improve the performance of the apparatus, as it may be possible for a meaningful response to be provided by the apparatus when the receiving party would not have otherwise been able to provide a response.

The determined location may be a "low-resolution" location that the receiving party is located in, such as a continent, country or time zone and can enable a meaningful response to be provided when the receiving party is unavailable due a time difference between the receiving and calling party's. For example, the location may give an indication as to whether or not the receiving party is likely to be asleep. The location may be a "high-resolution" location such as a meeting room, hotel room, restaurant, etc and can enable a meaningful response to be provided when the receiving party would not find it socially acceptable or polite to respond to the call.

The determined location of the receiving party may be a location that is relative to the calling party, for example a time difference between the calling party and the receiving party may be used for providing the response.

The at least one memory and the computer program code may be configured to, with the at least one processor, cause the apparatus to provide the authorised response to the calling party in accordance with a local time of the receiving party. In this way, the response to the calling party can also be tailored in accordance with the local time of the receiving party, for example the apparatus can provide a different response depending upon whether it is day or night for the receiving party. This can provide particular advantages for scenarios where the calling party does not know the local time for the receiving party.

The apparatus may further comprise at least one memory configured to store information relating to the one or more contacts of the receiving party, wherein the one or more contacts have privilege information associated therewith. The at least one memory may be provided locally to the apparatus or remote from the apparatus. In one example, at least one memory may be remote from the apparatus and accessible over a network such as the internet.

The apparatus may further comprise one or more of the following that are configured to determine the location of the receiving party:
  a global positioning system (GPS);
  a local position determining application;
  the processor being configured to process information in a calendar application to determine an intended location of the receiving party;
  the processor being configured to identify a cellular network (for example which base station(s)) that the apparatus is communicating with; and
  the processor being configured to compare a local time of the receiving party with a local time of the calling party.

The response may comprise one or more of:
  the location of the receiving party;
  the local time associated with the apparatus;
  one or more calendar entries associated with the receiving party at a time of receiving a call from the calling party; and
  one or more calendar entries associated with the receiving party for a predetermined period of time after receiving a call from the calling party.

The authorised response may comprise one or more selectable options that are selectable by the calling party. The one or more selectable options can be considered as suitable for the privilege information associated with the calling party and the location of the receiving party. The options may be configured to provide the calling party with functionality to automatically run an application or perform a function when selected. The application or function may be identified as being potentially suitable for the identity of the calling party and the location of the receiving party. This can avoid the calling party having to manually terminate a call and initiate a separate application or function for proceeding.

The apparatus may be configured to end a call automatically upon receipt of a signal indicative of the calling party selecting an option. This can reduce a number of key presses (or other user interactions) that are required by the calling party in order to take appropriate action for the location of the receiving party. In some examples, no key presses (or other user interactions) by the receiving party may be required, and this can be particularly advantageous when the receiving party is at a location where they cannot interact with their apparatus.

The one or more options may represent one or more of:
functionality for the calling party to send a message, such as an instant message, an SMS or an email, to the receiving party;
functionality for the calling party to request an appointment in a calendar application associated with the receiving party;
functionality for the calling party to set an appointment in a calendar application associated with the receiving party;
functionality for the calling party to set an alarm for the calling party to try to call the receiving party again;
functionality for the calling party to set an alarm for the receiving party to return the calling party's call;
a macro or a piece of software that a device associated with the calling party can act upon.

The functionality of one or more of the options may be configured to be performed in response to a single click or user interaction by the calling party. The functionality of one or more of the options may be pre-loaded with information. The information may be determined in accordance with the location of the receiving party and/or the privilege information associated with the calling party. For example, the time of an alarm can be proposed automatically in accordance with the time difference between the locations of the calling and receiving party, the body of the message may be proposed automatically, a time and date for an appointment may be proposed automatically. In other examples, such information may be provided manually by the calling party.

Functionality for the calling party to request or set an appointment in a calendar application associated with the receiving party may be configured to identify a period of time at which the calling party and receiving party are both available, and pre-load the appointment with the identified period of time.

The one or more selectable options may be derived from one or more of:
information associated with apparatus,
information associated with receiving party,
information associated with an apparatus associated with the calling party,
information associated with the calling party,
information associated with a third party device, such as a server that is in electronic communication with the apparatus, and
an apparatus associated with the calling party over the internet.

It will be appreciated that the one or more selectable options may be derived from one or more of the above-identified possibilities, or none of the above-identified possibilities, or something else. The above-identified possibilities are non-limiting examples of information from which one or more selectable options may be derived.

The apparatus may be configured to receive a call from a calling party;

According to a further aspect, there is provided a mobile telephone comprising any apparatus disclosed herein. The mobile telephone may have a touch sensitive screen According to a further aspect, there is provided a method comprising:
comparing an identifier of a calling party with one or more contacts of a receiving party to determine privilege information that provides one or more authorised receiving party location-based responses; and
determining a location of a receiving party and providing an associated authorised response to the calling party.

There may be provided a device, or a module for a device, comprising any apparatus disclosed herein. The device may be a portable device such as a personal digital assistant (PDA), a gaming device, or a laptop computer (as non-limiting examples), or may be a generally static device such as a desk top computer or a television. It will be appreciated that in some examples any device that can have network functionality such that the device can receive and/or transmit electronic communications can be provided with any apparatus disclosed herein. The device may be any self-capable device connected to a service that can provide "PDA-functionality" through Cloud computing. The device may have a touch sensitive screen.

There may be provided a computer program, recorded on a carrier, the computer program comprising computer code configured to:
compare an identifier of a calling party with one or more contacts of a receiving party to determine privilege information associated with the calling party, the privilege information providing one or more authorised receiving party location-based responses; and
determine a location of the receiving party and provide an associated authorised response to the calling party There may be provided a computer-readable storage medium having stored thereon a data structure, the data structure configured to:
compare an identifier of a calling party with one or more contacts of a receiving party to determine privilege information that provides one or more authorised receiving party location-based responses;
and determine a location of a receiving party and providing an associated authorised response to the calling party.

There may be provided an apparatus comprising:
at least one processor configured to compare an identifier of a calling party with one or more contacts of a receiving party to determine privilege information associated with the calling party, the privilege information providing one or more authorised receiving party location-based responses; and
at least one processor configured to determine a location of the receiving party and provide an associated authorised response to the calling party.

There may be provided a computer program product comprising a computer-readable medium bearing computer program code embodied therein for use with a computer, the computer program code comprising:
code for comparing an identifier of a calling party with one or more contacts of a receiving party to determine privilege information that provides one or more authorised receiving party location-based responses; and
code for determining a location of a receiving party and providing an associated authorised response to the calling party.

There may be provided a computer-readable medium encoded with instructions that, when executed by a computer, perform:

comparing an identifier of a calling party with one or more contacts of a receiving party to determine privilege information that provides one or more authorised receiving party location-based responses; and     determining a location of a receiving party and providing an associated authorised response to the calling party.

There may be provided the electronic distribution of any computer program disclosed herein.

There may be provided a method of assembling any apparatus or device disclosed herein.

There may be provided apparatus comprising:

at least one means for processing configured to compare an identifier of a calling party with one or more contacts of a receiving party to determine privilege information associated with the calling party, the privilege information providing one or more authorised receiving party location-based responses; and     at least one means for processing configured to determine a location of the receiving party and provide an associated authorised response to the calling party.

There may be provided apparatus comprising:

at least one memory configured to store information relating to one or more contacts associated with a receiving party, wherein the one or more contacts have privilege information associated therewith; and     at least one processor configured to compare an identifier of a calling party with the one or more contacts to determine privilege information associated with the calling party;

wherein the at least one processor is configured to cause the apparatus at least to determine a location of the receiving party and provide a response to the calling party in accordance with: (i) the determined privilege information associated with the calling party, and (ii) the location of the receiving party.

There may be provided a method comprising:

comparing an identifier of a calling party with one or more contacts stored in memory of an apparatus, wherein the one or more contacts have privilege information associated therewith;

determining privilege information associated with the calling party;

determining a location of a receiving party; and automatically causing the apparatus to respond to the calling party in accordance with the determined privilege information associated with the calling party and the location of the receiving party.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS/EMBODIMENTS

One or more embodiments disclosed herein relate to apparatus that can receive a call from a calling party, and provide one or more authorised receiving party location-based responses to the calling party. In some embodiments, the responses are provided automatically, without user interaction from the receiving party. The one or more responses are determined in accordance with privilege information associated with the calling party and a location of the receiving party. In this way, different calling parties can receive different levels of information in a response and the information can be tailored for a location of the receiving party. For example, if the calling party is the spouse of the receiving party then they may receive detailed personal information as part of the response, whereas if the calling party is a business acquaintance of the receiving party then they may receive less detailed information.

In some embodiments, the response can include one or more options that are selectable by the calling party. The options may be activated with "one click" to launch an application or perform a function that is considered appropriate for the location of the receiving party and privilege information associated with the calling party. For example, a calling party may be able to initiate appropriate functionality of an SMS application or a calendar application by selecting one of the options.

Figure 1:
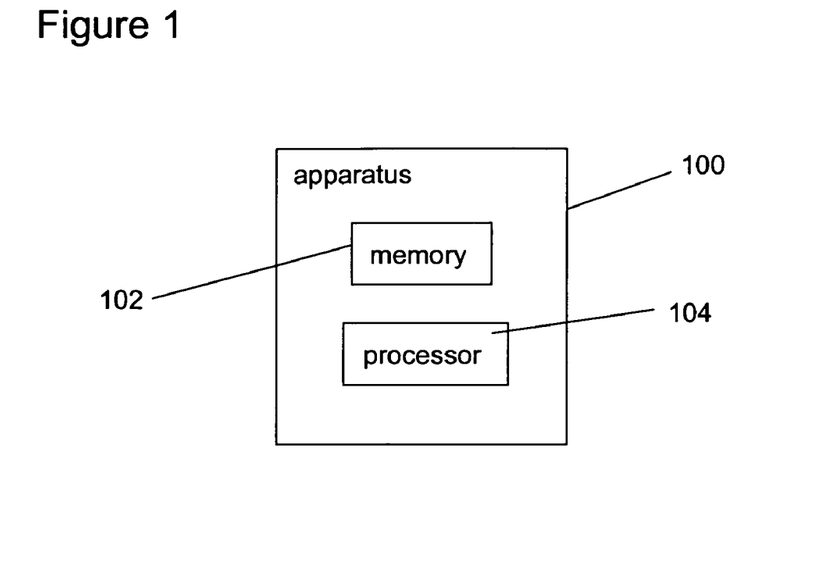
FIG. 1 illustrates apparatus according to an embodiment of the invention.

FIG. 1 illustrates an apparatus 100 according to a first embodiment. The apparatus 100 includes at least one processor 104, and optionally at least one memory 102. The memory 102 can store information relating to one or more contacts from whom it is possible to receive a call. The one or more contacts that are stored in memory 102 have privilege information associated with them. The privilege information can be configured by a user when the contact information is initially stored in the memory, and/or can be inserted or amended for a contact that is already stored in memory 102. In some examples, the privilege information can be stored in the same memory as the contacts, or a different memory that may be remote from the apparatus 100.

The apparatus 100 may be associated with a device (not shown in FIG. 1) that can receive a call from a calling party, and therefore the apparatus 100 can be considered as being associated with a receiving party.

Upon receipt of a call from a calling party, the processor 104 is configured to compare an identifier of the calling party with one or more of the contacts of the receiving party. In this example the contacts are stored in memory 102, although in other embodiments the contacts of the receiving party may be available in any way (which may be local to the apparatus 100, or remote from the apparatus 100) such that they can be used by the processor 104. The processor 104 can then determine privilege information associated with the calling party.

The privilege information in this example provides one or more authorised receiving party location-based responses. That is, responses that are authorised as acceptable for the associated calling party, wherein different responses are suitable for different locations of the receiving party.

Different privilege information may be associated with different user groups, such that calling parties that are in the same user group have the same privilege information. The privilege information can provide an indication of responses that are authorised for the members of the user group, and as discussed below, the responses can be associated with one or more locations of the receiving party.

The apparatus 100 is configured to determine a location of the receiving party and provide one or more associated authorised responses to the calling party. The authorised response is provided in accordance with the location of the receiving party, and this can involve providing only those authorised receiving party location-based responses (that have been determined in accordance with privilege information associated with the calling party, described above) that are also associated with the location of the receiving party.

The location can be an absolute location such as: in the US (or any other country), in Africa (or any other continent), in time zone GMT+2 hours (or any other time zone), 10 Main Street (or any other address), in meeting room 1, as non-limiting examples.

Alternatively, or additionally, the location of the receiving party can be relative to a location of the calling party, such as: 5 hours ahead of the calling party.

It will be appreciated that the provision of the response can be made in any number different ways. In one example, the apparatus 100 can cause one or more components that are not illustrated in FIG. 1 to put together an electronic message, such as a short messaging service (SMS) message, and transmit the electronic message to a device associated with the calling party.

In one example, the privilege information and associated authorised receiving part location-based responses can be stored in memory as a table, and an example table is provided below.

TABLE 1

| Privilege information | Location 1 | Location 2 | Location 3 |
|---|---|---|---|
| 1 | Response A | Response A<br>Response E | Response L |
| 2 | Response A<br>Response B | Response B<br>Response E<br>Response F | Response M |
| 3 | Response A<br>Response C | Response G | Response L<br>Response M |
| 4 | Response B<br>Response C<br>Response D | Response G<br>Response H | Response O<br>Response P |
| 5 | Response A<br>Response B<br>Response C<br>Response D | Response A<br>Response B<br>Response C<br>Response D<br>Response Q<br>Response R<br>Response S<br>Response T | Response Q<br>Response R<br>Response S<br>Response T |

This example table can be used as follows. Upon determination of privilege information associated with a calling party, a row in the table can be identified, and the responses that are associated with that row are identified as authorised receiving party location-based responses. For example, for a calling party with a privilege level of 2, then Responses A, B, E, F and M are identified as the authorised receiving party location-based responses.

After the location of the receiving party has been determined, then the responses in the column that corresponds to the location (and the row that has been identified above) are provided as authorised responses to the calling party. Continuing the example from the previous paragraph, if the receiving party is at location 1, then Responses A and B are provided to the calling party, whereas if the receiving party is at location 3, then only Response M is provided.

As indicated above, it will be appreciated that the location may be a relative location, and location 1 may represent a minimum time difference between the calling and receiving parties.

In a further example, the potential responses identified by using the table above may be further processed in accordance with a local time of the receiving party in order to identify any responses that are forbidden from being sent at the local time of the receiving party. An example table is shown below.

TABLE 2

| Time of day | 8 am to 8 pm | 8 pm to 8 am |
|---|---|---|
| Forbidden responses | Response A<br>Response B | Response C<br>Response D |

Continuing with the example provided above, if the calling party has a privilege level of 5, and the receiving party is at location 2, then Responses A, B, C, D, Q, R, S, T are identified from table 1. However, processing of table 2 reveals that if it is during the day (between 8 am and 8 pm) then Responses A and B should not be provided, and if it is during the night (between 8 pm and 8 am) then Responses C and D should not be provided. Therefore, the apparatus provides Responses C, D, Q, R, S, and T during the day and Responses A, B, Q, R, S, and T during the night.

Such a mode of operation may be entered manually by the receiving party selecting appropriate functionality through a user interface of their device. Alternatively, such a mode of operation can be entered automatically, for example at certain times of the day and/or when an appointment in the receiving party's calendar is indicative that the mode of operation should be entered.

Figure 2:
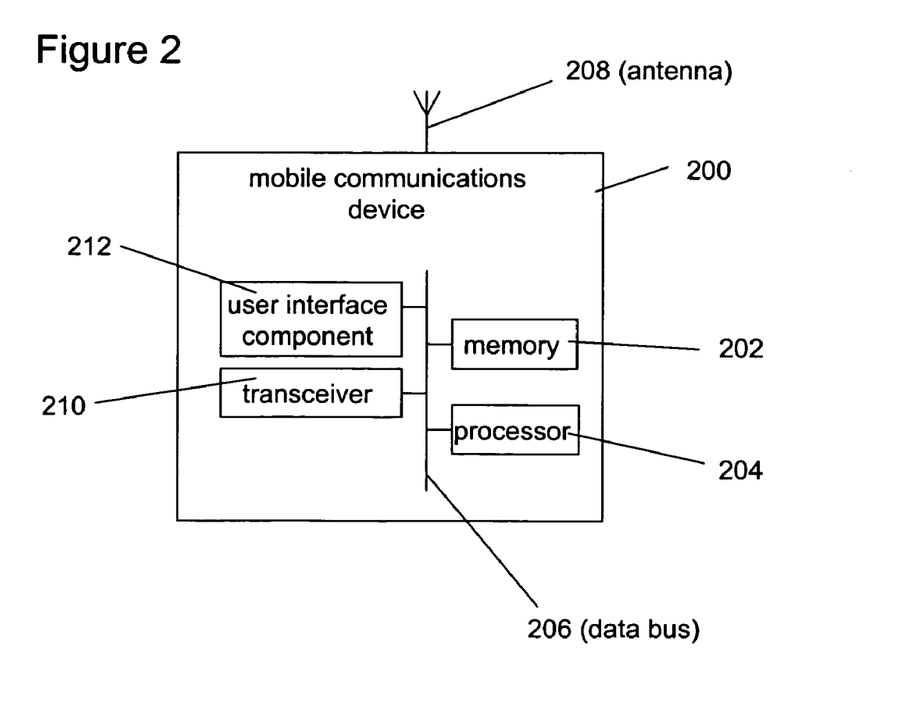
FIG. 2 illustrates apparatus according to another embodiment of the invention.

FIG. 2 illustrates an apparatus 200 according to another embodiment. In this example, the apparatus 200 is a mobile communications device such as a mobile telephone or a personal digital assistant (PDA).

The mobile communications device 200 includes a memory 202, a processor 204, and a transceiver 210 component for transmitting data from, and receiving data at, the mobile communications device 200. The mobile communications device 200 includes an antenna 208. The mobile communications device 200 also includes a user interface component 212 for receiving user input, and providing output to a user. The user interface component 212 may comprise a touch sensitive screen in some embodiments. All of these components are connected to a data bus 206. Components of the mobile communications device 200 that operate in the usual way as known in the art will not be described in detail here.

One or more embodiments disclosed herein can be considered as advantageous for mobile communications devices 200 that can be used at different locations because the functionality of the mobile communications device 200 can be tailored according to the specific location and for a specific calling party.

Figure 3:
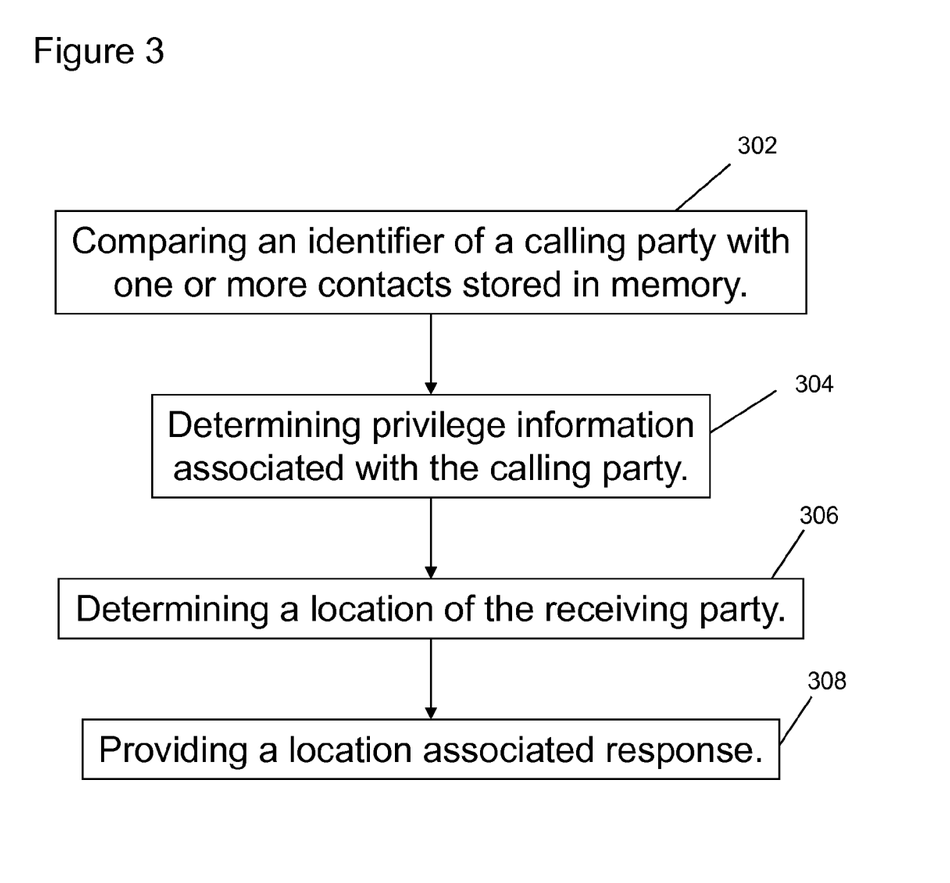
FIG. 3 illustrates schematically a process flow according to an embodiment of the invention.

FIG. 3 illustrates a process flow according to a further embodiment. The process flow starts at step 302 following receipt of a call from a calling party, by comparing an identifier of the calling party with one or more contacts stored in memory. The memory may be the one or more memories 102 shown in FIG. 1. In this way the identity of the calling party can be determined.

At step 304, the process flow determines privilege information associated with the calling party. In one embodiment, the privilege information can be determined by retrieving the privilege information from a location in memory that is associated with the one or more contacts that are stored in memory. This memory may be local to a device that is receiving the call.

In other embodiments, a different memory, which may not be local to a device that is receiving the call, may be used to determine the privilege information. For example, the device that is receiving the call may retrieve the privilege information from a remote memory, which may be accessed over the internet or any other network.

The privilege information may be a value, for example in the range of 1 to 5, which provides for visibility of different information relating to the receiving party in accordance with the value. In other examples, privilege information may be more specifically configured by a user for one or more contacts in their contact list. The privilege information can include an identifier as to whether or not the contact has access to information from certain applications associated with the receiving party. Such certain applications can include a calendar application, an email application, etc. Furthermore, the privilege information may also represent the degree of information that is available for a specific application. In a calendar application example, privilege information can determine to what degree, if any, a calling party can view appointment information in the calendar of a receiving party. A calling party with a "low" privilege may see that a receiving party is merely "unavailable" for all appointments, whereas as a calling party with a "high" privilege may be able to view the location and attendees of a scheduled appointment for a receiving party.

At step 306, the process flow determines a location of the receiving party. As described in more detail below, the determined location is used to control how a response is provided to the calling party.

At step 308, the process flow provides a response to the calling party in accordance with the determined privilege information and the location of the receiving party. The response may be provided in accordance with one or more of the following:
  a "high-resolution" location such as:
    the country in which the receiving party is located;
    the time zone in which the receiving party is located;
    the city in which the receiving party is located;
    the time difference between the receiving and calling parties;
  or a "low-level" location such as the type of location in which the receiving party is located, for example a business location including a meeting room, a personal location including a hotel room or a restaurant, or a "do-not-disturb" location.

The location may be determined by one or more of the following:
  using a position determining application such as a global positioning system (GPS) or a local position determining application such as one that uses beacons within specific locations or rooms in a building;
  processing information in a calendar application, or other appointment monitoring application, that is indicative of an intended location of the receiving party;
  identifying with which base station(s) in a cellular network the mobile device is communicating;
  comparing a local time of the receiving party's device with a local time of the calling party's device.

Non-limiting examples of responses that can be provided to the calling party include providing the calling party with one or more selectable options to initiate the following functionality:
  send SMS to receiving party asking them to call back when suitable;
  set an alarm for the calling party to try to call the receiving party again.
  set an alarm for the receiving party to return the calling party's call.
  create a new entry in a calendar application, which may be the calendar application of the calling and/or receiving party.

The time of an alarm can be proposed or set automatically, and can be automatically selected in accordance with the time difference between the locations of the calling and receiving party. In other examples, the time of an alarm may be provided manually by the calling party.

The alarm requests and/or calendar appointments can include priority information.

Priority information may be entered manually by the calling party. As an example, if a wife (calling party) is calling her husband (receiving party) who is on a business trip, then the wife can set priority information based on the urgency of the call. The wife may also be provided with functionality to provide an indication of how long the call is expected to last. The expected length of the call may be directly embedded in the length of the calendar entry/alarm. If the wife cannot start the lawn mover (with an expectation of 10 minute explanation being required), then the wife may provide an indication of a low priority. If the wife is flying to the husband's location, and she cannot get tickets from the counter at the airport as she is missing some information (such as a portion of an address), then the wife may provide an indication of a high priority, as the wife may need to provide the required information before the plane leaves within the next 50 minutes. The wife may also provide an indication that the call will last for one minute.

In some examples, priority information can be added automatically. Such examples include a processor being configured to compare the alarm or calendar appointment that is to be set up with existing alarms or calendar appointments, and determine if the priority level of an existing alarm or calendar appointment should be copied for the new alarm or calendar appointment. Also, the processor may be able to compare the potential alarm or appointment with other information relating to the calling or receiving party in order to determine the priority level that should be attributed. For example, a to-do list, or other schedule of upcoming deadlines may be processed in order to determine a priority level fort the new alarm or appointment.

Examples of priority information can include: associating lower importance appointments/alarms/messages with one to three arrows pointing down; associating higher importance appointments/alarms/messages with one to three exclamation marks; and not associating any extra markings (such as arrows or exclamation marks) with "normal" appointments/alarms/messages.

In some examples, a further table (that may be similar in structure to Tables 1 and 2 above) may be provided in order to determine which of a plurality of response should be provided to the calling party in accordance with the priority information.

Further non-limiting examples of responses that can be provided to the calling party include providing the calling party with one or more selectable options that include a macro or a piece of software that a device associated with the calling party can act upon. Example macros can provide call forwarding, automatically generating a new message to the receiving party's secretary, and any other action based on characteristics, such as the location, of the receiving party. Such options may be considered as providing direct actions. The receiving party's device can generate such instructions, and send them to the calling party so that they can be acted upon. The instructions may be acted upon manually by the calling party or automatically by the calling party's device. In such an example, software instructions are sent from the receiving party to the calling party. An example is the provision to the calling party of functionality to directly control the receiving party's device. Such functionality may be advantageous for IT organizations. It will be appreciated that the possibilities for functionality that can be provided to the calling party are greater than just calendar-related and location-related, and may broadly relate to implementing any software. Such software can include, but is not limited to, launching an application or performing a function.

It will be appreciated that not all calling parties need to have such deep privileges to the receiving party's calendar/device. Similar functions can be defined for specific uses, and can include setting a number and type of options that are to be displayed in accordance with one or more predefined criteria, including the privilege information associated with the calling party and location of the receiving party.

Figure 4:
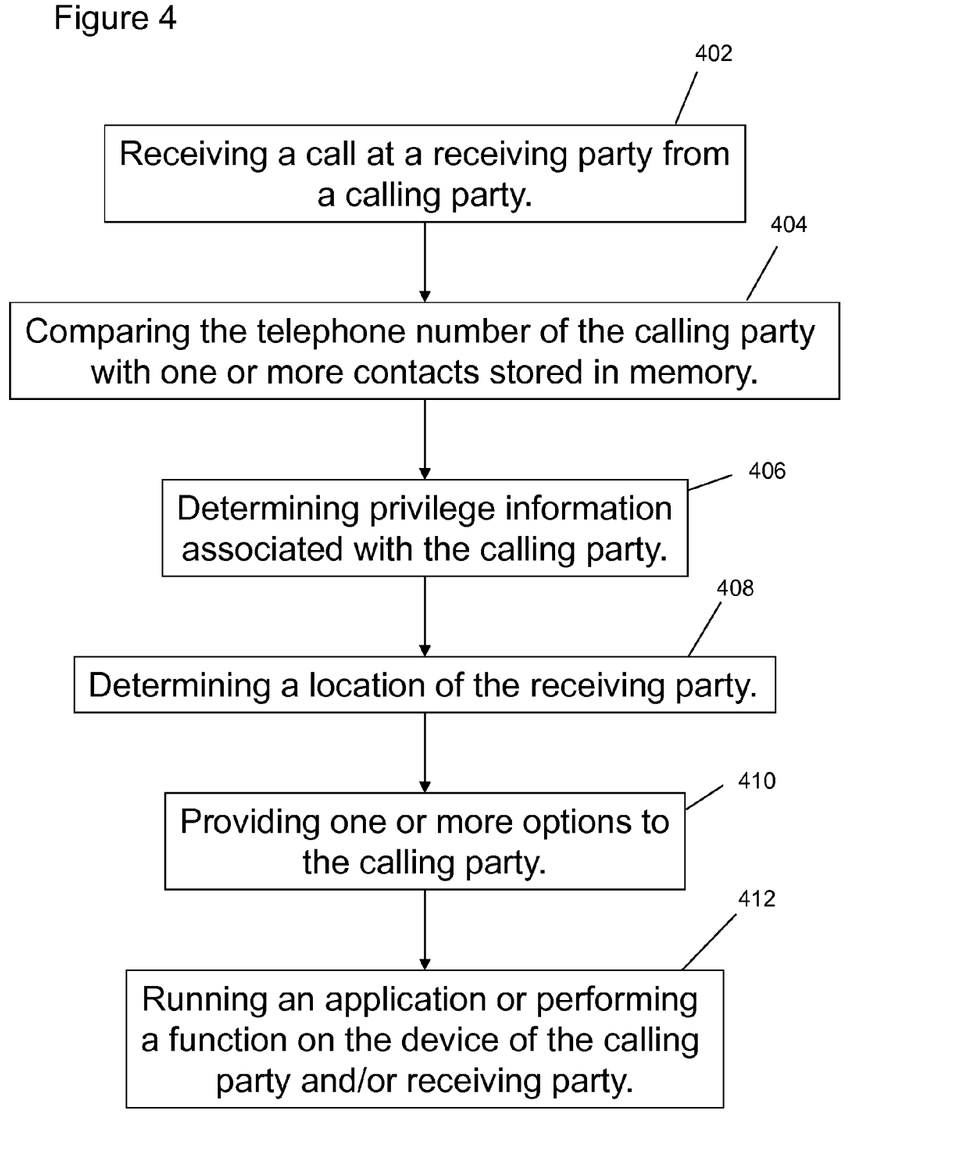
FIG. 4 illustrates schematically a process flow according to another embodiment of the invention.

FIG. 4 illustrates schematically a process flow according to another embodiment. The process flow begins at step 402 when a receiving party receives a telephone call from a calling party. The call can be a telephone call to a mobile telephone associated with the receiving party.

At step 404, the telephone number of the calling party is compared with one or more contacts stored in the memory of the receiving party's mobile telephone in order to identify the calling party. At step 406, privilege information associated with the calling party is determined, for example by retrieving this information from the memory in which the one or more contacts are stored. A known contact list that is stored in memory can be supplemented with privilege information according to some embodiments disclosed herein, such that the supplemental privilege information is usable for determining privilege information associated with the calling party. The privilege information may associate one or more contacts with a user group that can be used to determine how the device of the receiving party automatically responds to the device of the calling party.

At step 410, the location of the receiving party is determined, and this can be performed by utilising a GPS application associated with the receiving party's device as a non-limiting example.

In accordance with the determined privilege information and location of the receiving party, one or more selectable options are provided to the calling party at step 408. The selectable options may be provided on a touch sensitive screen in some examples. The options can be provided by displaying identifiers of applications or functions on a screen of a device associated with the calling party. The applications or functions can be considered as providing functionality that the calling party may want to use in light of the location of the receiving party. Such applications can include messaging applications, calendar applications, and any other known types of applications, and such functions can be functions associated with one or more of these applications.

At step 412, the process flow continues by running an application or performing a function on the device of the calling party and/or receiving party in accordance with an option that has been selected at step 410. In some embodiments, the application can be run or function performed by the calling party making "one-click" of an option that is provided at step 410. In some embodiments, the application or function can be pre-loaded with information that is identified as being suitable for a given combination of privilege information and location. For example, an SMS application can be run and pre-loaded with a message of "I tried to call you, but you were in a meeting. Please call me back." or any other suitable text. Selection of an option by the calling party may pre-load the SMS application with a message (as indicated above) and also send the message, all with a single "click" (which is an example of a user input operation) of an option that is provided at step 410. User selection of an option may automatically end the call that was received at step 402.

Figure 5:
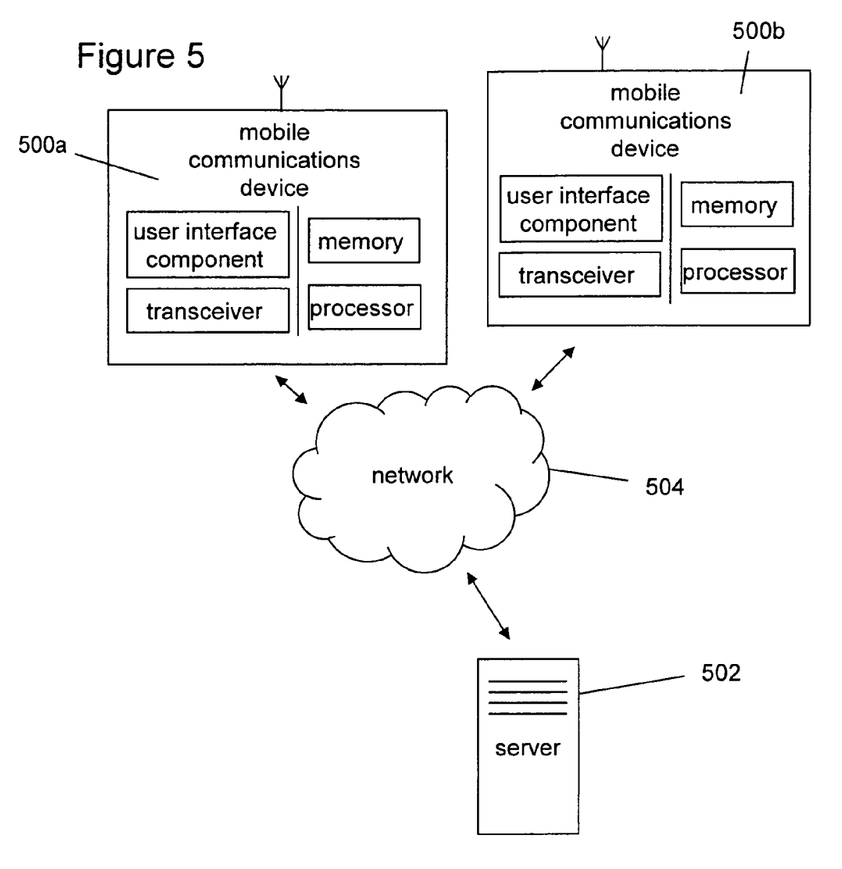
FIG. 5 illustrates apparatus according to another embodiment of the invention.

FIG. 5 illustrates an embodiment including two mobile communications devices 500*a*, 500*b* and a server computer 502, which can communicate with each other over a network shown schematically with reference 504 in FIG. 5. The network 504 may be a mobile telephony network such as a GSM network, the internet, or any other known network, or any combination of known networks. For example different information may be exchanged between devices 500*a*, 500*b* and the server 502 using different networks.

The mobile communications devices 500*a*, 500*b* may include one or more of the features of the mobile communications device 200 of FIG. 2.

A receiving mobile communications device 500*a* may communicate with the server 502 in order to determine a response that is to be sent to a calling mobile communications device 500*b*. As an example, the receiving mobile communications device 500*a* can use a "Pomopalvelu" service that is provided by the server 502, or any other similar or dissimilar services. Such a service may not be available directly on the mobile communications device 500*a* but can be parsed/decoded as required. Pomopalvelu is a service that shows the name for an unknown number. Other examples can be used when receiving calls from numbers that are not in a user's contacts list, for example by providing a secure link to the server 502 (which can use existing connections and/or secure systems), detecting the number, identifying an associated person using a suitable service, and determining if the receiving party has any links or relationship with the identified person. For example, if it is found that the identified person is "linked" to the receiving party in the LinkedIn network, then more rights (a higher privilege) may be provided for that user than for a person with no links to the receiving party.

In another example, a communication device can be used by a calling party to make an appointment with a receiving party. The receiving party may be a garage that services cars, a tax office, a solicitor, or any party with which a calling party would like to make an appointment. Such an example can enable a user to automatically make an appointment with the calling party, whereby the receiving party's "location" is representative of whether or not an appointment is available.

The calling party can call the receiving party, and without the receiving party answering the call, the calling party can be automatically provided with a response. The response can be indicative of one or more timeslots for which the receiving party is available as determined from a calendar application associated with the receiving party. In some examples the timeslots may be representative of when both the receiving party and calling party are available as determined from the calendar applications associated with both the receiving and calling parties.

The response may include a plurality of options, and each option may be representative of an available timeslot. If the calling party selects an option associated with an available timeslot, then a suitable entry may be automatically scheduled in the receiving party's calendar application. The entry may also be automatically scheduled in the calling party's calendar application.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

Figure 6:
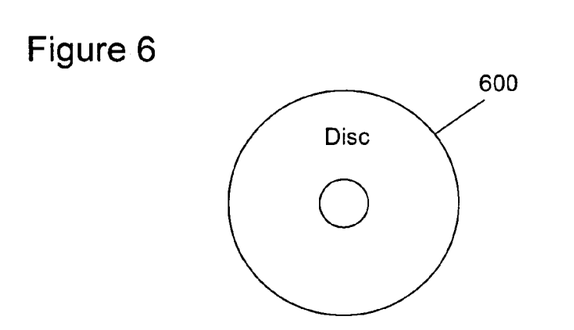
FIG. 6 illustrates schematically a computer readable medium providing a program according to an embodiment of the present invention.

FIG. 6 illustrates schematically a computer/processor readable media 600 providing a program according to an embodiment of the present invention. In this example, the computer/processor readable media is a disc such as a digital versatile disc (DVD) or a compact disc (CD). In other embodiments, the computer readable media may be any media that has been programmed in such a way as to carry out an inventive function.

It will be appreciated to the skilled reader that any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one memory including computer program code;
   the at least one memory and the computer program code configured to, with the at least one processor, cause the apparatus at least to:

in response to receiving a call at a receiving party from a calling party,
  compare an identifier of a calling party with one or more contacts of the receiving party to determine privilege information associated with the calling party, the privilege information associated with one or more authorised receiving party responses; and
  determine a location of the receiving party; and
provide a said authorised receiving party response to the calling party based on the determined location of the receiving party, wherein said authorised receiving party response comprises one or more options, the one or more options comprising:
  functionality for the calling party to send a message to the receiving party;
  functionality for the calling party to request an appointment in a calendar application associated with the receiving party;
  functionality for the calling party to set an appointment in a calendar application associated with the receiving party;
  functionality for the calling party to set an alarm for the calling party to try to call the receiving party again;
  functionality for the calling party to set an alarm for the receiving party to return the calling party's call; and
  a macro or a piece of software that a device can interact with, the device being associated with the calling party.

2. The apparatus of claim 1, wherein the one or more authorised receiving party location-based responses comprise responses for potential locations of the receiving party, and are authorised as acceptable for the associated calling party in accordance with the privilege information.

3. The apparatus of claim 1, wherein the at least one processor is configured to select one or more of the "authorised receiving party location-based responses" as the "associated authorised response" in accordance with location of the receiving party.

4. The apparatus of claim 1, wherein one or more of the options of the authorised receiving party response comprises one or more selectable options that are selectable by the calling party.

5. The apparatus of claim 4, wherein one or more of the options are configured to provide the calling party with functionality to automatically run an application or perform a function when selected.

6. The apparatus of claim 5, wherein the functionality of one or more of the options is configured to be performed in response to a single click or user interaction by the calling party.

7. The apparatus of claim 5, wherein the functionality of one or more of the options is pre-loaded with information.

8. The apparatus of claim 1, wherein the functionality for the calling party to request or set an appointment in a calendar application associated with the receiving party is configured to identify a period of time at which the calling party and receiving party are available, and pre-load the appointment with the identified period of time.

9. The apparatus of claim 4, wherein the one or more options are further provided in accordance with one or more of:
  information associated with apparatus,
  information associated with the receiving party,
  information associated with an apparatus associated with the calling party,
  information associated with the calling party,
  information associated with a third party device, such as a server that is in electronic communication with the apparatus, and
  an apparatus associated with the calling party over the internet.

10. The apparatus of claim 4, wherein the apparatus is configured to end a call automatically upon receipt of a signal indicative of the calling party selecting an option.

11. The apparatus of claim 1, wherein the determined location of the receiving party is a location that is relative to the calling party.

12. The apparatus of claim 1, wherein the at least one memory and the computer program code are configured to, with the at least one processor, cause the apparatus to provide the authorised response to the calling party in accordance with a local time of the receiving party.

13. The apparatus of claim 1, further comprising at least one memory configured to store information relating to the one or more contacts of the receiving party, wherein the one or more contacts have privilege information associated therewith.

14. The apparatus of claim 1, further comprising one or more of the following that are configured to determine the location of the receiving party:
  a global positioning system (GPS);
  a local position determining application;
  the processor being configured to process information in a calendar application to determine an intended location of the receiving party;
  the processor being configured to identify a cellular network that the apparatus is communicating with; and
  the processor being configured to compare a local time of the receiving party with a local time of the calling party.

15. The apparatus of claim 1, wherein the response comprises one or more of:
  the location of the receiving party;
  the local time associated with the apparatus;
  one or more calendar entries associated with the user of the apparatus at a time of receiving a call from the calling party; and
  one or more calendar entries associated with the user of the apparatus for a predetermined period of time after receiving a call from the calling party.

16. The apparatus of claim 1, wherein the apparatus comprises a portable device, a personal digital assistant, a mobile telephone, a gaming device, a laptop computer, a desk top computer or a television, or a part or module for the same.

17. A method of using an apparatus, the method comprising:
  in response to receiving a call at a receiving party from a calling party,
    comparing, using the apparatus, an identifier of the calling party with one or more contacts of a receiving party to determine privilege information associated with one or more authorised receiving party responses; and
    determining, using the apparatus, a location of a receiving party; and
  providing, using the apparatus, an associated authorised response to the calling party based on the determined location of the receiving party, wherein said authorised response comprises one or more options, the one or more options comprising
    functionality for the calling party to send a message to the receiving party;

functionality for the calling party to request an appointment in a calendar application associated with the receiving party;

functionality for the calling party to set an appointment in a calendar application associated with the receiving party;

functionality for the calling party to set an alarm for the calling party to try to call the receiving party again;

functionality for the calling party to set an alarm for the receiving party to return the calling party's call; and a macro or a piece of software that a device can interact with, the device being associated with the calling party.

18. A computer-readable non-transitory medium encoded with instructions that, when executed by a computer, perform:

in response to receiving a call at a receiving party from a calling party, comparing an identifier of the calling party with one or more contacts of a receiving party to determine privilege information associated with one or more authorised receiving party responses;

determining a location of a receiving party; and providing an associated authorised response to the calling party based on the determined location of the receiving party, wherein said authorised response comprises one or more options, the one or more options comprising functionality for the calling party to send a message to the receiving party;

functionality for the calling party to request an appointment in a calendar application associated with the receiving party;

functionality for the calling party to set an appointment in a calendar application associated with the receiving party;

functionality for the calling party to set an alarm for the calling party to try to call the receiving party again;

functionality for the calling party to set an alarm for the receiving party to return the calling party's call; and a macro or a piece of software that a device can interact with, the device being associated with the calling party.

19. The apparatus of claim 1, wherein the apparatus forms part of at least one of:

a device of the receiving party; and a server.

* * * * *